(12) United States Patent
Leppanen et al.

(10) Patent No.: US 12,035,125 B2
(45) Date of Patent: Jul. 9, 2024

(54) PROCESSING OF AUDIO DATA

(71) Applicant: Nokia Technologies Oy, Espoo (FI)

(72) Inventors: Jussi Artturi Leppanen, Tampere (FI); Sujeet Shyamsundar Mate, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 192 days.

(21) Appl. No.: 17/699,604

(22) Filed: Mar. 21, 2022

(65) Prior Publication Data
US 2022/0312142 A1 Sep. 29, 2022

(30) Foreign Application Priority Data
Mar. 29, 2021 (EP) ..................... 21165465

(51) Int. Cl.
*H04S 7/00* (2006.01)
*H04R 5/02* (2006.01)
*H04R 5/027* (2006.01)

(52) U.S. Cl.
CPC ............. *H04S 7/303* (2013.01); *H04R 5/02* (2013.01); *H04R 5/027* (2013.01); *H04S 2400/11* (2013.01); *H04S 2400/15* (2013.01)

(58) Field of Classification Search
CPC .. H04S 7/303; H04S 2400/11; H04S 2400/15; H04R 5/02; H04R 5/027
See application file for complete search history.

(56) References Cited

U.S. PATENT DOCUMENTS

| 2012/0206452 | A1* | 8/2012 | Geisner | G06F 3/013 345/419 |
|---|---|---|---|---|
| 2018/0206057 | A1* | 7/2018 | Kim | G10L 19/008 |
| 2019/0373395 | A1* | 12/2019 | Sarkar | H04S 7/304 |
| 2020/0296533 | A1* | 9/2020 | Thall | H04S 7/305 |
| 2021/0092546 | A1 | 3/2021 | Terentiv et al. | 7/303 |
| 2023/0188920 | A1* | 6/2023 | Terentiv | H04S 7/302 381/1 |

FOREIGN PATENT DOCUMENTS

CN 110164464 A 8/2019

* cited by examiner

*Primary Examiner* — Jason R Kurr
(74) *Attorney, Agent, or Firm* — Harrington & Smith

(57) ABSTRACT

An apparatus, method and computer program are disclosed. The apparatus may include circuitry configured for determining, relative to one or more real audio sources in an environment, a relative position of a virtual object in the environment. The circuitry may be configured for determining, based on the relative position, an occluded region of the environment in which audio signals from the one or more real audio sources would be occluded by the virtual object. The circuitry may be configured for outputting, to a user in the environment, audio data, the outputting circuitry configured to operate in a first mode and in a second mode. The circuitry may be configured for switching the outputting means circuitry between the first mode and the second mode based on a location of the user relative to the occluded region.

20 Claims, 11 Drawing Sheets

PROCESSING OF AUDIO DATA

FIELD

Example embodiments relate to an apparatus, method and computer program for processing audio data, for example for processing audio data to account for occlusion of real life audio sources by an extended reality object.

BACKGROUND

An Augmented Reality (AR) system may provide a virtual object for user exploration during a consumption phase. Virtual objects may be any computer-generated version of an object, for example a captured real world object, which a user can view or interact with through a user device. The virtual object can be placed in a real world environment to provide an augmented reality experience to a user, in which the user hears sounds corresponding to both real and virtual objects and sees both real and virtual objects.

The user device may have a pair of displays and/or one or more (optionally a pair of) audio output transducers, e.g. earphones, headphones or loudspeakers. An AR headset is an example of a user device in this context.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus comprising means for: determining, relative to one or more real audio sources in an environment, a relative position of a virtual object in the environment; determining, based on the relative position, an occluded region of the environment in which audio signals from the one or more real audio sources would be occluded by the virtual object; outputting, to a user in the environment, audio data, the outputting means configured to operate in a first mode and in a second mode, wherein the first mode is an open mode, and substantially no processing is performed on audio signals received from the one or more real audio sources in the first mode, and wherein in the second mode the audio data is generated by processing audio signals received from the one or more real audio sources to at least partially remove those audio signals which would be occluded by the virtual object; and switching the outputting means between the first mode and the second mode based on a location of the user relative to the occluded region.

The apparatus may further comprise means for receiving audio signals from the one or more real audio sources. Optionally, the receiving means may comprise one or more microphones and/or the outputting means comprises one or more audio output transducers.

The receiving means and the outputting means may be provided by an augmented reality device wearable by the user, the augmented reality device providing the virtual object. By having the receiving means in the same location as the user, the processing of audio signals may be computationally simpler than if the receiving means are located remote from the user. Optionally, the apparatus is an augmented reality device.

The means for determining, relative to the one or more real audio sources in an environment, the relative position of the virtual object in the environment may comprise: determining, based on the received audio signals, a position of the one or more real audio sources in the environment; and determining one or more of a size, a location and an orientation of the virtual object from associated augmented reality content.

The second mode may be a closed mode, and the apparatus may further comprise means for: processing the received audio signals from the one or more real audio sources to at least partially remove those audio signals which would be occluded by the virtual object; and providing the processed audio signals to the outputting means.

The means for switching between the first mode and the second mode based on a location of the user relative to the occluded region may comprise means for: determining a current location of the user at a current time point; and operating the outputting means in the first mode if the current location of the user is outside of the occluded region; and operating the outputting means in the second mode if the current location of the user is within the occluded region.

The apparatus may further comprise means for determining an estimated position of the user at a future time point. Optionally, the means for switching between the first mode and the second mode based on a location of the user relative to the occluded region comprises means for switching between the first mode and the second mode based on the current location of the user and the estimated position of the user.

Optionally, no processing is performed on audio signals received from the one or more real audio sources in the first mode, such that the audio signals are heard by the user without intermediate processing. Optionally, the open mode is a transparent or pass-through mode.

The apparatus may further comprise means for processing audio signals received from the one or more real audio sources to compensate for an acoustic effect of the virtual object on the audio signals. Compensating for the acoustic effect of the virtual object may provide a more realistic and immersive augmented reality experience to a user.

The outputting means may be configured to output audio data associated with the virtual object in both the first and second modes. In this way, the user may hear virtual audio signals from the virtual object without interruption, and only real audio signals are processed or modified to compensate for the effect of the virtual object on the acoustics in the occluded region.

The means for switching may be configured to switch the outputting means between the first mode and the second mode based on a size of the occluded region.

According to a second aspect, this specification describes a method, comprising: determining, relative to one or more real audio sources in an environment, a relative position of a virtual object in the environment; determining, based on the relative position, an occluded region of the environment in which audio signals from the one or more real audio sources would be occluded by the virtual object; outputting, to a user in the environment via outputting means, audio data, the outputting means configured to operate in a first mode and in a second mode, wherein the first mode is an open mode, and substantially no processing is performed on audio signals received from the one or more real audio sources in the first mode, and wherein in the second mode the audio data is generated by processing audio signals received from the one or more real audio sources to at least partially remove those audio signals which would be occluded by the virtual object; and switching the outputting means between the first mode and the second mode based on a location of the user relative to the occluded region.

The method may further comprise receiving audio signals from the one or more real audio sources. Receiving audio signals from the one or more real audio sources may comprise receiving audio signals via or through one or more receiving means, optionally through one or more microphones. Optionally, the outputting means comprises one or more audio output transducers.

The receiving means and the outputting means may be provided by an augmented reality device wearable by the user, the augmented reality device providing the virtual object.

Determining, relative to the one or more real audio sources in an environment, the relative position of the virtual object in the environment may comprise: determining, based on the received audio signals, a position of the one or more real audio sources in the environment; and determining one or more of a size, a location and an orientation of the virtual object from associated augmented reality content.

The second mode may be a closed mode, and the method may further comprise: processing the received audio signals from the one or more real audio sources to at least partially remove those audio signals which would be occluded by the virtual object; and providing the processed audio signals to the outputting means.

Switching between the first mode and the second mode based on a location of the user relative to the occluded region may comprise: determining a current location of the user at a current time point; and operating the outputting means in the first mode if the current location of the user is outside of the occluded region; and operating the outputting means in the second mode if the current location of the user is within the occluded region.

The method may further comprise determining an estimated position of the user at a future time point. Optionally, switching between the first mode and the second mode based on a location of the user relative to the occluded region comprises switching between the first mode and the second mode based on the current location of the user and the estimated position of the user.

Optionally, switching the outputting means between the first mode and the second mode may comprise switching the outputting means based on a size of the occluded region.

Optionally, no processing is performed on audio signals received from the one or more real audio sources in the first mode, such that the audio signals are heard by the user without intermediate processing. Optionally, the open mode is a transparent or pass-through mode.

The method may further comprise processing audio signals received from the one or more real audio sources to compensate for an acoustic effect of the virtual object on the audio signals. The outputting means may be configured to output audio data associated with the virtual object in both the first and second modes.

According to a third aspect, this specification describes a computer program comprising instructions for causing an apparatus to perform at least the following: determining, relative to one or more real audio sources in an environment, a relative position of a virtual object in the environment; determining, based on the relative position, an occluded region of the environment in which audio signals from the one or more real audio sources would be occluded by the virtual object; outputting, to a user in the environment via outputting means, audio data, the outputting means configured to operate in a first mode and in a second mode, wherein the first mode is an open mode, and substantially no processing is performed on audio signals received from the one or more real audio sources in the first mode, and wherein in the second mode the audio data is generated by processing audio signals received from the one or more real audio sources to at least partially remove those audio signals which would be occluded by the virtual object; and switching the outputting means between the first mode and the second mode based on a location of the user relative to the occluded region.

Example embodiments of the third aspect may also provide any feature of the second aspect.

According to a fourth aspect, this specification describes a computer-readable medium (such as a non-transitory computer-readable medium) comprising program instructions stored thereon for performing at least the following: determining, relative to one or more real audio sources in an environment, a relative position of a virtual object in the environment; determining, based on the relative position, an occluded region of the environment in which audio signals from the one or more real audio sources would be occluded by the virtual object; outputting, to a user in the environment via outputting means, audio data, the outputting means configured to operate in a first mode and in a second mode, wherein the first mode is an open mode, and substantially no processing is performed on audio signals received from the one or more real audio sources in the first mode, and wherein in the second mode the audio data is generated by processing audio signals received from the one or more real audio sources to at least partially remove those audio signals which would be occluded by the virtual object; and switching the outputting means between the first mode and the second mode based on a location of the user relative to the occluded region.

According to a fifth aspect, this specification describes an apparatus comprising: at least one processor; and at least one memory including computer program code which, when executed by the at least one processor, causes the apparatus to: determine, relative to one or more real audio sources in an environment, a relative position of a virtual object in the environment; determine, based on the relative position, an occluded region of the environment in which audio signals from the one or more real audio sources would be occluded by the virtual object; output, to a user in the environment via outputting means, audio data, the outputting means configured to operate in a first mode and in a second mode, wherein the first mode is an open mode, and substantially no processing is performed on audio signals received from the one or more real audio sources in the first mode, and wherein in the second mode the audio data is generated by processing audio signals received from the one or more real audio sources to at least partially remove those audio signals which would be occluded by the virtual object; and switch the outputting means between the first mode and the second mode based on a location of the user relative to the occluded region.

Also disclosed herein is an apparatus comprising means for: determining, relative to one or more real audio sources in an environment, a relative position of a virtual object in the environment; determining, based on the relative position, an occluded region of the environment in which audio signals from the one or more real audio sources would be occluded by the virtual object; processing audio signals received, at the occluded region and from the one or more real audio sources, to generate audio data, the processing means configured to generate the audio data by at least partially removing those of the received audio signals which would be occluded by the virtual object; and outputting, to a user in the environment, the generated audio data.

By removing those of the received audio signals which would be occluded by the virtual object, the apparatus may compensate for an acoustic effect of the virtual object on the audio signals. Compensating for the acoustic effect of the virtual object may provide a more realistic and immersive augmented reality experience to a user.

The apparatus may further comprise means for receiving audio signals from the one or more real audio sources. Optionally, the receiving means may comprise one or more microphones and/or the outputting means comprises one or more audio output transducers.

The receiving means and the outputting means may be provided by an augmented reality device wearable by the user, the augmented reality device providing the virtual object. By having the receiving means in the same location as the user, the processing of audio signals may be computationally simpler than if the receiving means are located remote from the user. Optionally, the apparatus is an augmented reality device.

The means for determining, relative to the one or more real audio sources in an environment, the relative position of the virtual object in the environment may comprise: determining, based on the received audio signals, a position of the one or more real audio sources in the environment; and determining one or more of a size, a location and an orientation of the virtual object from associated augmented reality content.

The apparatus may further comprise means for providing the processed audio signals to the outputting means. The outputting means may be configured to output both audio data associated with the virtual object and the generated audio data. In this way, the user may hear virtual audio signals from the virtual object without interruption, and only real audio signals are processed or modified to compensate for the effect of the virtual object on the acoustics in the occluded region.

Also disclosed herein is a method comprising: determining, relative to one or more real audio sources in an environment, a relative position of a virtual object in the environment; determining, based on the relative position, an occluded region of the environment in which audio signals from the one or more real audio sources would be occluded by the virtual object; processing audio signals received, at the occluded region and from the one or more real audio sources, to generate audio data, the processing means configured to generate the audio data by at least partially removing those of the received audio signals which would be occluded by the virtual object; and outputting, to a user in the environment, the generated audio data.

Example embodiments of the apparatus may also provide any feature of the method.

This specification also describes a computer program comprising instructions for causing an apparatus to perform at least the above method and embodiments. This specification also describes a computer-readable medium (such as a non-transitory computer-readable medium) comprising program instructions stored thereon for performing at least the above method and embodiments. This specification describes an apparatus comprising: at least one processor; and at least one memory including computer program code which, when executed by the at least one processor, causes the apparatus to perform at least the above method and embodiments.

BRIEF DESCRIPTION OF DRAWINGS

Example embodiments will now be described, by way of non-limiting example, with reference to the accompanying drawings, in which.

DETAILED DESCRIPTION

Example embodiments relate to methods, computer programs and apparatuses for processing and rendering audio data, for example processing audio data to account for the occluding effect of virtual objects on real audio sources in a real world environment. A headset mode may be adapted (or switched) between different modes to render the processed audio to a user.

Example embodiments may relate to extended reality (XR) methods and apparatuses, for example virtual reality (VR), augmented reality (AR) and/or mixed reality (MR) methods and apparatuses. Example embodiments will focus on an AR system and method, but it should be understood that embodiments are applicable to any system or method that involves processing of audio such that real world sounds can be perceived by a listening user to substantially correspond to real world sounds if a virtual object presented or displayed to the user had a real, physical, presence in the environment.

Figure 1:
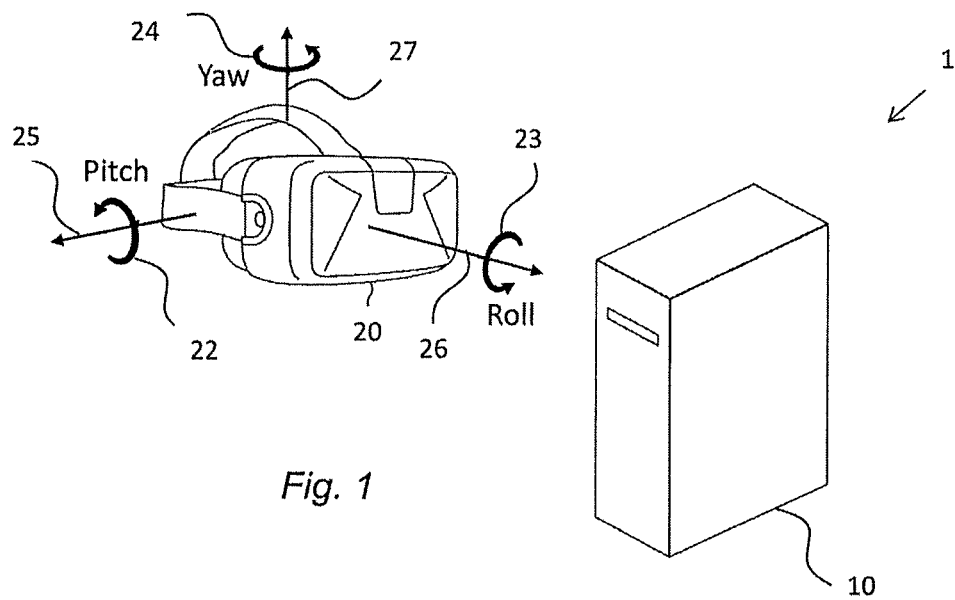
FIG. 1 is a perspective view of an augmented reality system.

FIG. 1 is a schematic illustration of an AR system 1 which represents user-end equipment. The AR system 1 includes a user device in the form of an AR headset 20 for outputting video and audio data for a virtual object, and an AR media player 10 for rendering the video and audio data at the AR headset 20. The AR headset 20 may comprise one or more (here shown as two) video screens for displaying video data and one or more (here shown as two) audio output transducers, e.g. earphones, headphones or loudspeakers, for output of audio data. In some example embodiments, a separate user control (not shown) may be associated with the AR system 1, e.g. a hand-held controller.

The AR headset 20 may receive the video and audio data from the AR media player 10. The AR media player 10 may be part of a separate device which is connected to the AR headset 20 by a wired or wireless connection. For example, the AR media player 10 may comprise a games console, a PC, laptop or tablet computer configured to communicate the video and audio data to the AR headset 20. Alternatively, the AR media player 10 may form part of the AR headset 20. The AR headset may be of any suitable type.

The AR system 1 may include means for determining a position of the user. The position of the user may include the spatial position of the user and/or an orientation of the user or part of the user's body. For example, the AR system 1 may be configured to determine the spatial position of the user by means of determining the spatial position of the AR headset 20. Over successive time frames, a measure of movement may therefore be determined based on the different spatial positions of the AR headset 20.

For example, the AR headset 20 may comprise motion tracking sensors which may include one or more of gyroscopes, accelerometers and structured light systems. Alternatively, or additionally, the AR headset 20 may comprise a positioning receiver, such as a Global Navigation Satellite System (GNSS) receiver and/or another positioning system such as a WiFi positioning receiver or a cellular positioning receiver which operate based on, for example, measurement of Angle of Arrival (AoA), Time of Arrival (ToA) and/or Received Signal Strength Indication (RSSI) information.

Spatial position and movement of the user may also be determined using one or more cameras configured to detect and track user movement, possibly in conjunction with one or more markers or sensors carried by the user or placed on the AR headset 20.

The AR system 1 may also comprise means for determining an orientation of part of the user's body, for example orientation of the user's head. This may also be determined by determining an orientation of the AR headset 20 using, for example, motion tracking sensors as mentioned above. Over successive time frames, a measure of a change in orientation of the user's head may therefore also be determined, e.g. to identify an amount of rotational change. Orientation of the user's head may be used to help determine user trajectory, for example.

The orientation of the user's head may also be determined using one or more cameras configured to detect and track head orientation, possibly in conjunction with one or more markers or sensors carried by the user or placed on the AR headset 20.

The AR system 1 may also comprise means for determining an orientation of one part of the user's body with respect to another part of the user's body. For example, the AR system 1 may determine the orientation of an upper body part (e.g. torso) of the user with respect to a lower body part (e.g. legs) of the user. This may enable the AR system 1 to identify, for example, a downwards leaning motion based on a detected change in upper body orientation with respect to lower body orientation. The orientation of the user's upper body with respect to the lower body may also be determined using one or more cameras configured to detect and track the upper and lower body parts, possibly in conjunction with one or more markers or sensors carried by the user.

Determining the spatial position of the user and their head orientation enables the AR system 1 to track the user, for example to determine a current visual field-of-view (FOV) which may determine which video and audio data to output to the user via the AR headset 20. Determining the spatial position of the user and/or other movements, e.g. orientation changes and movements of individual body parts, also enables the AR system 1 to track a user in an environment, and to estimate a future trajectory.

Data which represents, or from which can be derived, a spatial position of the user, an orientation of a user's body part and/or position of a user's body part may be referred to herein as position or positional data.

FIG. 1 indicates respective orientations of pitch 22, roll 23 and yaw 24 and also translational movement in Euclidean space along side-to-side, front-to-back and up-and-down axes 25, 26, and 27. These represent so-called six-degrees-of freedom (6DoF) which a user may change when exploring or consuming a virtual object represented by video and audio data.

Figure 2:
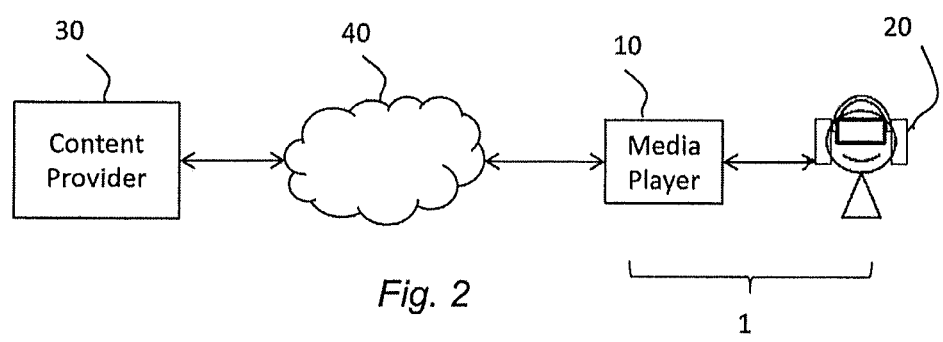
FIG. 2 is a schematic view of a network including the FIG. 1 augmented reality system.

Referring to FIG. 2, a content provider 30 may store and transmit, e.g. by streaming, video and audio data representing a particular virtual space for output to the AR headset 20. Responsive to receive or download requests sent by the AR media player 10, the content provider 30 may stream the video and audio data over a data network 40, which may be any network, for example an IP network such as the Internet. The remote content provider 30 may or may not be at the location or system where the video and audio data is captured, created and/or processed. For illustration purposes, we may assume that the content provider 30 also captures, encodes and stores the video and audio data, as well as streaming it responsive to signals from the AR display system 1.

Figure 3:
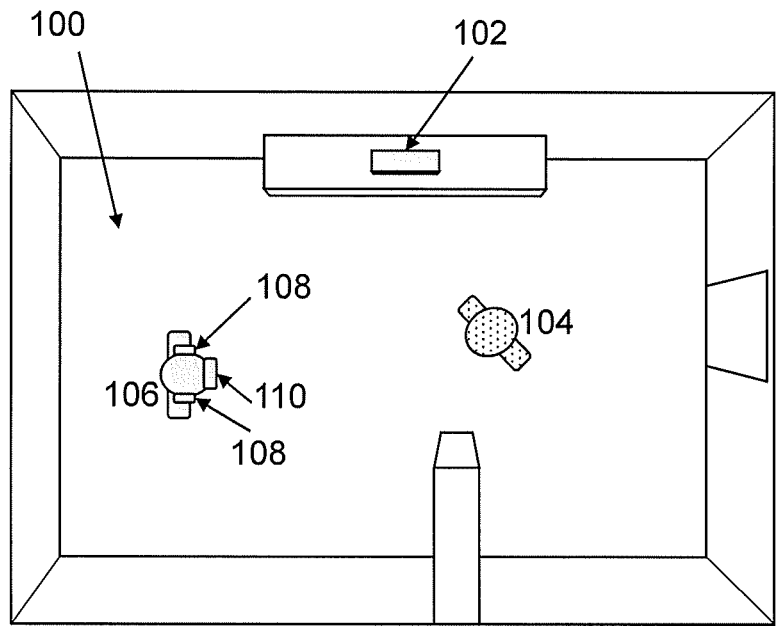
FIG. 3 is a schematic top-plan view of a real world environment comprising a virtual object.

FIG. 3 is a schematic illustration of a real world environment 100 comprising a user 106 and a real audio source 102 (such as a speaker). A sound or audio source may be any object, e.g. a real world object, which produces a sound. An AR system is provided in the environment, the AR system including a user device (an augmented reality device wearable by the user 106, or AR user device) in the form of an AR headset for outputting video and audio data for a virtual space, and an AR media player for rendering the video and audio data at the AR headset. The AR system can be the AR system 1 of FIG. 1, for example.

The AR user device (or AR headset) may comprise one or more video screens no for displaying video data (shown here as a head mounted display, or HMD) and one or more audio output transducers 108, e.g. earphones, headphones or loudspeakers, for output of audio data. In FIG. 3 there two audio output transducers 108 are shown, but the disclosure is not limited to this. The user 106 is shown as wearing the AR device. In some example embodiments, the audio output transducers 108 are provided separately from the video screens 110, and may not be part of the AR headset. For example, the audio output transducers 108 may receive audio data for rendering from the AR system through any suitable wired or wireless connection.

The AR headset may be configured to provide video and audio data (received as part of AR content) to a user by means of the above-mentioned video screens no and audio output transducer(s) 108 (outputting means, whether integral to the AR headset or a connected but standalone component). In other words, the user sees AR visual content through the video screens no and hears AR audio content through the audio output transducer(s) 108 (outputting means, or means for outputting audio data). The outputting means are here provided by the augmented reality device wearable by the user 106.

The video data can comprise one or more virtual objects 104 which (from the perspective of the user 106) are placed within the real world environment 100 of the user. In other words, the augmented reality device wearable by the user can provide the virtual object to the user. For example, the virtual objects 104 can be overlaid with the real world environment 100. In other examples, the virtual objects displayed to the user may be in a virtual space. In the context of this specification, a virtual space may be any computer-generated version of a space, for example a captured real world space, in which a user can be immersed. In some example embodiments, the virtual space may be entirely computer-generated, i.e. not captured.

The audio data is audio data associated with the one or more virtual objects 104. The audio data can therefore be considered as virtual audio, or audio which is associated with a virtual audio source (for example, the one or more virtual objects 104), and may be referred to herein as virtual audio data (though it will be understand that real sounds are rendered). Other virtual audio sources may also be present in the AR content. Moreover, in some implementations the outputting means 108 may be configured to output other audio data to the user 106. In other words, the audio data output to a user through the outputting means can comprise audio data from one or more sources (real and/or virtual).

Figure 4:
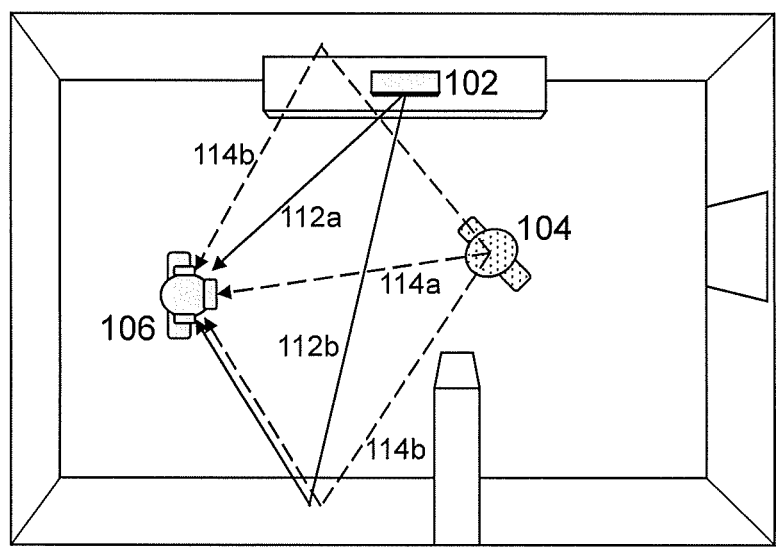
FIG. 4 is a schematic top-plan view of the environment of FIG. 3, illustrating real and virtual audio signals which may be heard (or perceived) by a user.

With reference to FIG. 4, audio signals 112 are received, by the user 106, from the real audio source 102. The audio signals 112 (represented by the solid arrows) comprise both direct audio signals 112*a* and reflected audio signals 112*b*. The outputting means 108 are configured to operate in a first, or open, mode. In the first mode, the audio signals 112 are received at the user's ear (i.e. perceived or heard by the user) with substantially no processing by the AR system or by any other means. For example, there may be no processing of the audio signals 112 and the outputting means 108 can be configured as open headphones/earbuds etc. which let the user perceive the real-world sound as is (the audio signals 112 heard by the user 106 may be slightly muffled by the presence of the outputting means 108 in or over the user's ear). There is no latency in the communication of the audio signals 112.

In other examples, the first (open) mode comprises the outputting means operating in a transparency, pass-through or hear-through mode, in which minimal processing is performed on the audio signals 112 to enable to the user to hear the real world as if they were not wearing the headphones/earbuds etc. (the outputting means 108). This transparency mode provides a very low latency signal path from an outside microphone (receiving means) to the audio output transducer(s) (outputting means 108). In other words, in the first or open mode the outputting means are configured to allow audio signals 112 to be captured and replayed to the user 106 with little to no intermediate processing.

Therefore, in the first (open) mode, the outputting means 108 may be configured to actively output first audio data associated with the real audio source 102, or there may be no audio data associated with the real audio source 102 output by the outputting means (the outputting means are passive in respect of external audio signals 112). It can be understood that, in the first mode, substantially no processing is performed on audio signals received from the one or more real audio sources.

In the first mode, the outputting means are also configured to output (in combination with the first audio data, if appropriate) second audio data to the user 106. The first audio data is output to the user as if virtual audio signals 114 have been received from the position of the virtual object 104. As with the real audio signals 112, the (virtual) audio signals comprise virtual direct audio signals 114*a* and virtual reflected audio signals 114*b*, each of which are presented to the user as part of the first audio data (the virtual audio signals 114 are represented by the dashed arrows). In other words, audio data from a virtual audio source associated with the virtual object 104 is rendered to a user through the outputting means 108. In particular, the virtual direct audio signal 114*a* is rendered binaurally from the direction of the virtual audio source (here the virtual object 104). Virtual reflected audio signals 114*b* are rendered to the user 106 based on a geometric model of the user's environment or surroundings (which geometric model is included as part of the AR content, in order to appropriately place the virtual object 104 in the environment 100).

Figure 5:
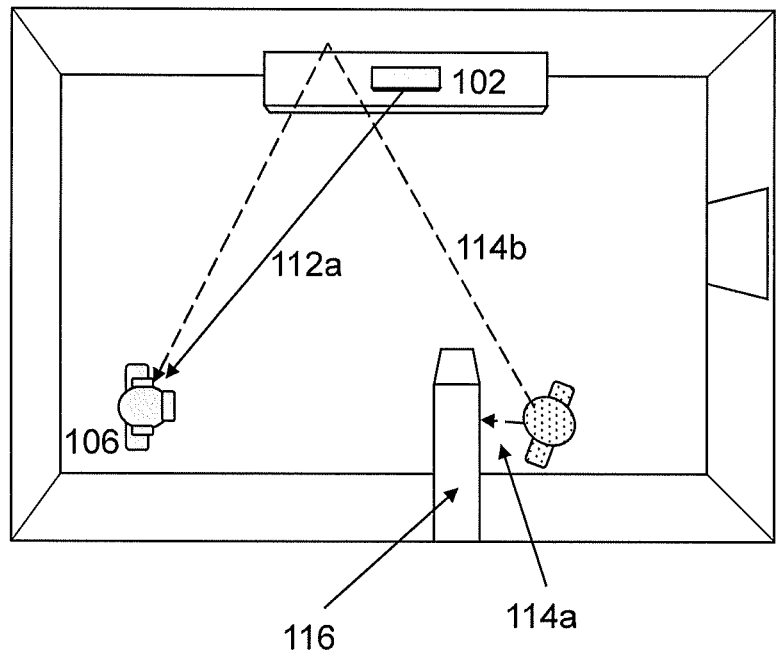
FIG. 5 is a schematic top-plan view of the environment of FIG. 3, illustrating the occluding effect of real-world objects within the environment and the treatment of virtual audio signals to account for real-world occluding objects.

With reference to FIG. 5, in some implementations the virtual direct audio signals 114*a* which would be directly received by the user 106 may be blocked by an obstruction 116, such as a wall or piece of furniture. Provided that the obstruction 116 is included within the geometric model of the environment 100, the second or virtual audio data rendered or output to the user may include only the virtual reflected audio signals 114*b* from the virtual object 104. The user may continue to receive/hear direct audio signals 112*a* from the real audio source as well as reflected audio signals (not shown). The audio data output to the user 106 is therefore modified to account for real obstructions 116 in the user environment 100. In other words, the audio data is processed such that sounds in the direction of the real audio source 102 are modified when output to the user device.

Figure 6:
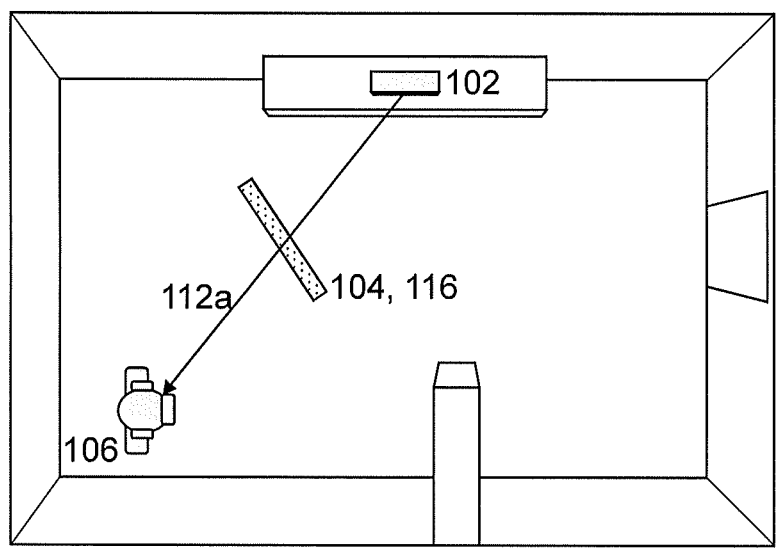
FIG. 6 is a schematic top-plan view of the environment of FIG. 3, illustrating an occluding virtual object.

However, such modification is not performed in circumstances where the virtual object 104 is the obstruction 116 (as is the case in FIG. 6). As shown, the virtual object 104 displayed by the AR system described above is located in the environment 100 such that, if the virtual object were replaced with a physical representation or manifestation, the audio signals 112 from the real audio source would be blocked or occluded by the virtual object 104 and thus prevented from reaching the user 106. In other words, the user may not be able to hear the direct audio signals 112*a* if the virtual object 104 was a real object (or the direct audio signals 112*a* may be muffled, or otherwise distorted or affected by the presence of the object between the user and the real audio source 102). The virtual object thus acts as an obstacle or obstruction 116.

It may therefore be desirable to process the real audio signals 112 to account for the presence of the virtual object 104, thereby to provide a more immersive AR experience to the user 106. Such an approach may also have utility in various applications, such as in illustrating the effect of objects on noise reduction (for example, the effect of trees on reducing road noise may be illustrated to a user in example embodiments).

Figure 7:
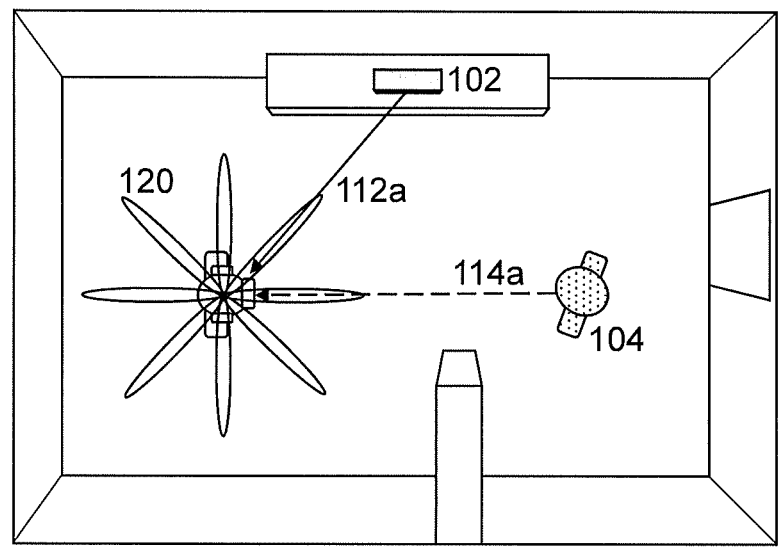
FIG. 7 is a schematic top-plan view of the environment of FIG. 3, illustrating an augmented reality device comprising one or more microphones and the treatment of real and virtual audio signals for a non-occluding virtual object.
Figure 8:
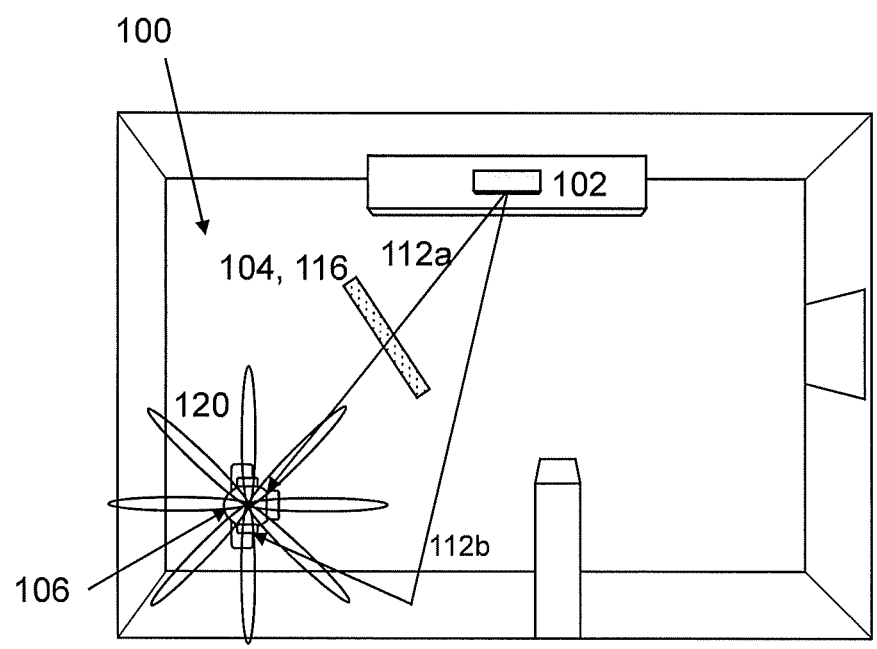
FIG. 8 is a schematic top-plan view of the environment of FIG. 7, illustrating an occluding virtual object within the environment.

With reference to FIG. 7 and FIG. 8, one example approach of processing audio data to account for the occluding effect of virtual objects 104 on audio signals 112 from real audio sources 102 in a real world environment 100 is described.

In FIG. 7, the AR device is shown to include a system compromising one or more microphones (optionally an array of microphones, also referred to herein as receiving means) and the one or more outputting means 108. The receiving means and the outputting means are provided by the augmented reality device wearable by the user (the AR device or AR user device). The outputting means of FIG. 7 are configured to operate in a closed mode. In the closed mode, the outputting means (such as headphones/earbuds) at least partially block the real audio signals 112. In order for the user 106 to hear the real audio source 102, the audio signals 112 need to be received by the microphone(s) and then reproduced to the user through the outputting means 108. In particular, an array of microphones can record the soundscape 120 around the user 106 and render or output the received audio signals 112 as first audio data to the user using the outputting means 108. As well as passive blocking of the audio signals 112 due to the presence of the outputting means in/over the user's ear, it will be understood that user devices which operate in such a closed mode can also be used for active noise cancellation to actively block audio signals 112 from reaching the user's ears.

With reference to FIG. 8, this approach of active noise cancellation can be modified to take account of the location of the virtual object 104 which provides the obstacle or obstruction 116. In particular, when the virtual object 104 is placed between the user 106 and the real audio source 102, the recorded soundscape 120 can be modified to remove or reduce those audio signals which would be occluded by the virtual object 104 (e.g. if it were a real object). For example, direct audio signals 112a would be blocked by the virtual object 104, but the reflected audio signals 112b would not. This may involve modifying the gain and/or diffuseness of recorded sounds in the direction of the real audio source 102. The modifying may dynamically change (e.g. increase or decrease) in response to the position of the user changing, e.g. moving towards or way from the occluding virtual object 104. For example, the gain of sounds in said direction may be decreased and/or the diffuseness increased as a user moves towards the occluding virtual object 104 and vice versa.

Figure 9:
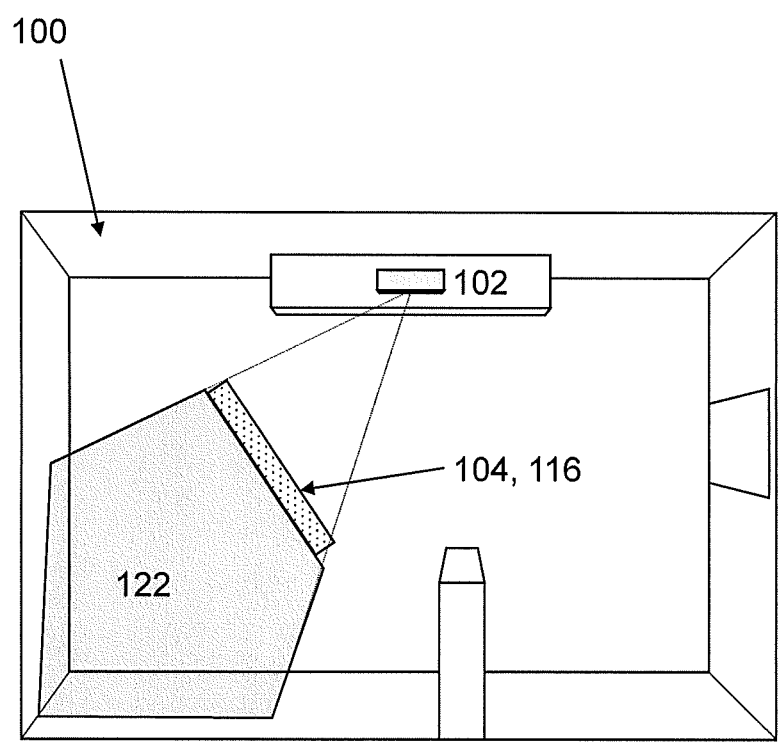
FIG. 9 is a schematic top-plan view of the environment of FIG. 8, illustrating an occluded region caused by the virtual object.

The area or region (or zone) of the environment in which one or more of audio signals 112 may be occluded by the presence of the virtual object 104 can be termed an "occluded region" of the environment 100. An example occluded region 122 is shown in FIG. 9. The occluded region can be defined as a volume in the user's AR content consumption space (here environment 100) where a sound source may be occluded by an AR object. The occluded region 122 may change if the occluding virtual object 104 causing the obstruction 116 is a moving virtual object.

Figure 10A:
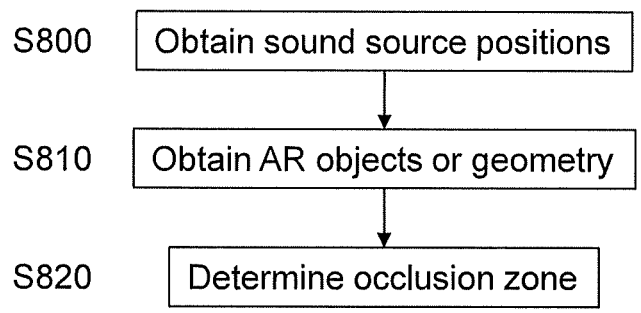
FIGS. 10A and 10B are flow diagrams showing processing operations according to some example embodiments.

With reference to FIG. 10A, one example approach of using a closed (or second) mode to process audio data to account for the occluding effect of virtual objects 104 on audio signals 112 from real audio source 102 in environment 100 is described.

In one example implementation, the process can be performed by an apparatus comprising means for determining, relative to the one or more real audio sources 102 in the environment 100, a position of the virtual object 104 in the environment. The position of the real audio source 102 can be obtained (S800), and the position (e.g. location, size and/or orientation) of the virtual object 104 can be obtained (S810).

The positions of real-life sound sources such as real audio source 102 can be estimated using the microphone array (receiving means) and the recorded soundscape 120. Sound source localization or direction of arrival algorithms could be used. For example, time-difference of arrival techniques on the signals obtained at the different microphones of the array may be used. In addition, data from any cameras on the AR device may be fed into a visual object detection/recognition algorithm so that possible sound producing items are identified. This vision data can be combined with the sound localization techniques to improve audio source localization.

Information about the position of the virtual object 104, and the geometry of the virtual object, can be obtained as part of the AR content provided to the AR device. The information may be presented as meshes or geometric primitives, for example. Information related to meshes or geometric primitives may include size, position and/or orientation information, which information is used to position the virtual objects 104 correctly in the AR scene and the user's AR consumption space (here environment 100). A geometric model of the environment 100 may also be used to position the real audio source 102 relative to the virtual object 104.

The apparatus can further comprise means for determining, based on the relative position (i.e. based on the positions obtained at S800 and S810), an occluded region 122 of the environment in which audio signals 112 from the one or more real audio sources 102 would be occluded by the virtual object. The occluded region is discussed above with reference to FIG. 9. In other words, based on the location of the real audio source 102, and the position and geometry of the virtual object 104 (i.e. the relative positions of the real audio source 102 and the virtual object 104), the occlusion zone or occluded region 122 is determined (8820). The determination of the occluded region can be done in real time and/or or the determination can be done for all the set of real audio source locations in a given space before a user begins consuming AR content (i.e. a set of occluded regions 122 can be stored for a given AR content in a given environment).

The apparatus can further comprise means for processing audio signals 112 received at (or in) to the occluded region 122 from the one or more real audio sources 102. The processing means can be configured to generate audio data by at least partially removing those of the received audio signals which would be occluded by the virtual object to compensate for an acoustic effect of the virtual object on the audio signals. For example, the virtual object 104 may block, muffle or otherwise distort the audio signals received at the user 106 to compensate or otherwise account for the occluding presence of the virtual object 104. The apparatus can further comprise outputting means 108, to the user 106, the generated audio data. When outputting means are operating in a closed mode as described above (and as described with reference to FIG. 7), the second audio data associated with the virtual audio source (here the virtual audio source is associated with the virtual object 104) may still be rendered to the user 106 through the outputting means in the same manner as described above with respect to FIG. 4 and FIG. 5, for example, using a geometric model of the environment from the AR content. In other words, audio data output by the outputting means can comprise the first audio data and/or the second audio data, depending on an operating mode (first or second) of the outputting means.

Figure 11A:
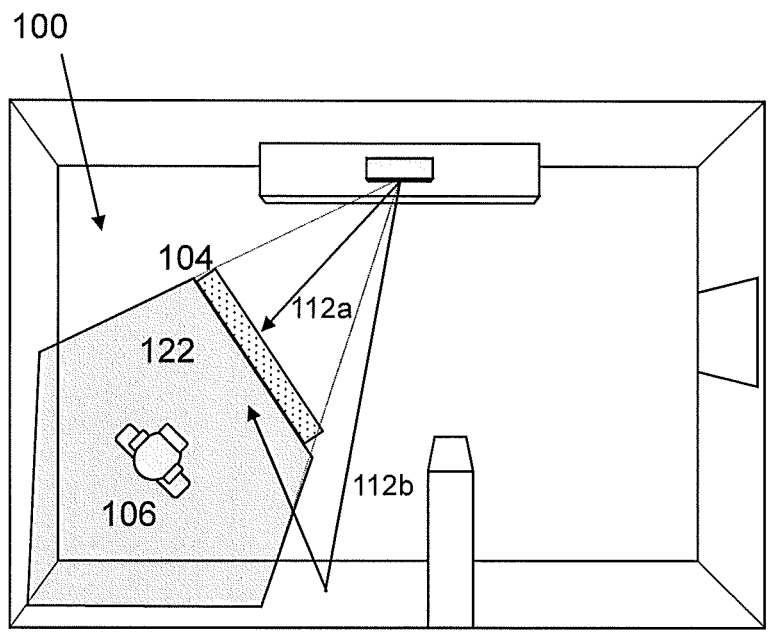
FIGS. 11A, 11B and 11C illustrate different treatments of real and virtual audio signals, the treatment depending on a position of a user relative to the occluded region.

The outputting of the audio data can be dependent on the user position. When the user 106 is positioned within the occluded region 122, as shown in FIG. 11A, the received audio signals can be processed to remove those signals which would be blocked by a physical representation of the virtual object 104. In other words, the audio data generated by at least partially removing those of the received audio signals which would be occluded by the virtual object 104 is output to the user through the outputting means 108. For example, the user 106 may hear the reflected audio signals 112*b* through the outputting means 108 but not the direct audio signals 112*a* (as is discussed above with respect to the arrangement of FIG. 8).

Figure 11B:
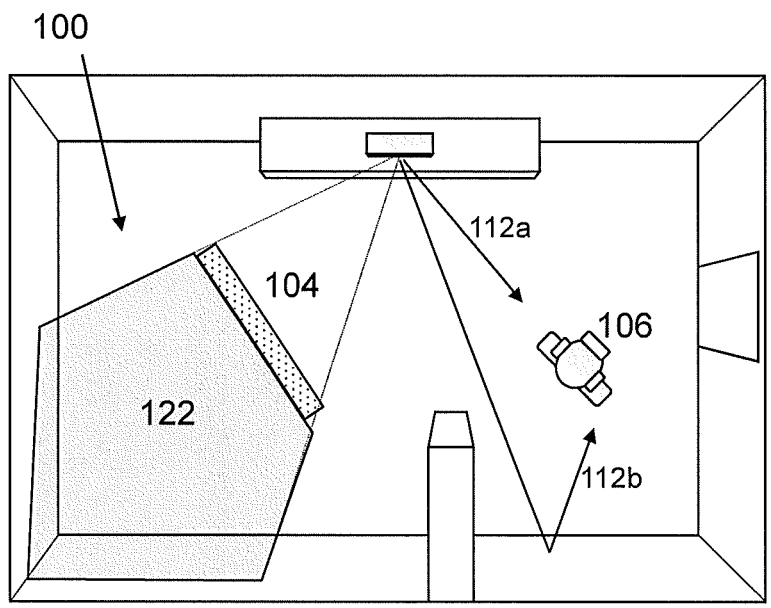

However, when the user is located outside of the occlusion zone, as in FIG. 11B, the audio data output to the user may comprise all of the received audio signals 112 (direct audio signals 112*a* and reflected audio signals 112*b*), since substantially none of the signals received at the user's current position are occluded by the virtual object. In other words, the received signals are not processed to remove any of the audio signals 112, and the recorded signals are replayed or reproduced to the user.

Figure 11C:
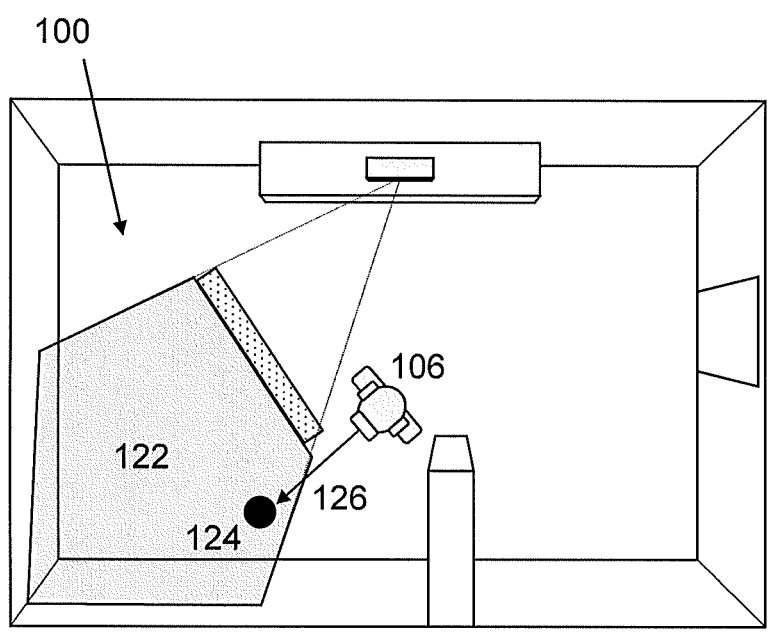

In some examples, the user 106 may be moving. As seen in FIG. 11C, the user may be moving from a current location to a new position 124 in the environment along a trajectory 126. The current location of the user is the location of the user in the environment 100 at a current time point (i.e. the point in time at which the location of the user is determined). The processing means of the apparatus can be configured to switch between simply replaying the audio signals 112 and processing the signals to remove one or more occluded signals at a point along the user's trajectory 126. In other words, the switching is based on the user's position, using the positional data.

The current position or location of the user 106 can be obtained from sensor data obtained by the AR device, for example using a camera or other vision data, as discussed above; the resulting positional data may optionally be combined with the geometric model of the environment 100. In addition, the user's trajectory 126 may optionally be estimated. If the user is moving, the trajectory 126 may be estimated based on the user's direction and speed of movement, which parameters can themselves be determined from the sensor data. These factors can be used to estimate the new position of the user at a future time point. In other words, an estimated position of the user at a future point in time may be determined. The determining of an estimated position of the user at a future time point may be based on the user's current location and the user's estimated trajectory. At the future point in time, the user may be at any suitable position along trajectory 126, or at a position on a different trajectory, depending on the user's speed and direction at the selected future time point. Any other factors or variables may also be used in the determining of an estimated position of the user.

The above described closed, or second mode, of the outputting means 108 can increase latency and in some cases can change the overall sound (i.e., by removing noise), even when the audio signals 112 are being replayed to the user 106 in full. In other words, the processing required to operate in a closed mode can increase latency in the signal path as compared to the first or open mode, and can change the overall sound quality. The second mode can therefore be slower and more computationally expensive than the first mode.

Generation of the audio data to remove one or more of the audio signals can further increase latency in the second mode. It can therefore be desirable to only operate in the second mode in particular circumstances. It has been recognised that operation in the second mode may only be required in circumstances where the above-described processing to remove one of more of the real audio signals 112 is desirable.

Figure 10B:
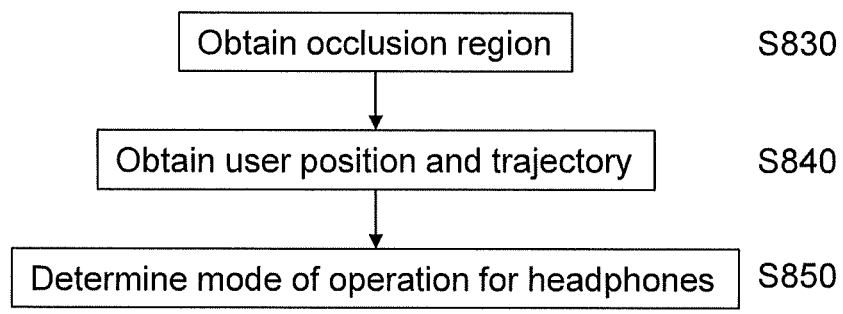

With reference to FIG. 10B, the occluded region 122 (determined at S820) is obtained S830. It will be understood that parameters of the occluded region 122 may be stored after S820, and then subsequently obtained. Alternatively, S820 and S830 can be combined and performed in a w single step. The user position (and optionally the user trajectory 126) may be determined or otherwise obtained at S840, for example using the techniques described above.

The outputting means 108, which can be of any suitable type, are configured to operate in both a first mode and in a second mode. The first mode is an open mode as described above, wherein substantially no processing is performed on audio signals 112 received from the one or more real audio sources 102. In the second mode, which may be a closed mode, the outputting means is configured to output to the user 106 audio data generated by processing audio signals 112 received from the one or more real audio sources 102 to at least partially remove those audio signals which would be occluded by the virtual object 104. The processing can be performed by any of the techniques described above.

The apparatus comprises means for switching the outputting means between the first mode and the second mode based on a location of the user relative to the occluded region 122. In other words, the location or position of the user can be used to determine a mode of operation for the outputting means S850. For example, the mode of operation is determined based on whether the user 106 is in the occluded region 122 or not. When the user is in the occluded region 122 (as in FIG. 11A), the second (closed) mode of operation is used. When the user is outside of the occluded region 122 (as in FIG. 11B), the first (open) mode of operation is used. In this way, a more immersive experience may be provided to the user whilst at the same time latency and computational resources can be reduced.

Figure 12A:
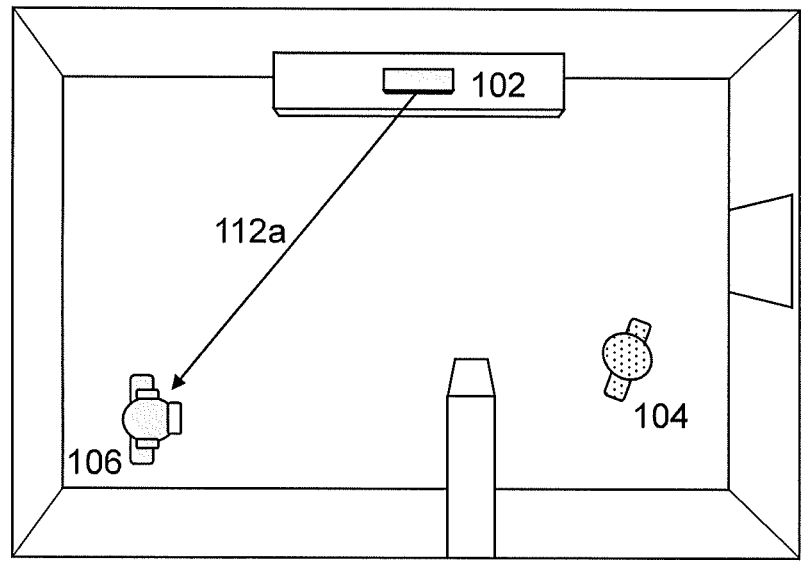
FIGS. 12A and 12B illustrate 11C illustrate different treatments of real and virtual audio signals, the treatment depending on a position of a user within the environment relative to the virtual object.
Figure 12B:
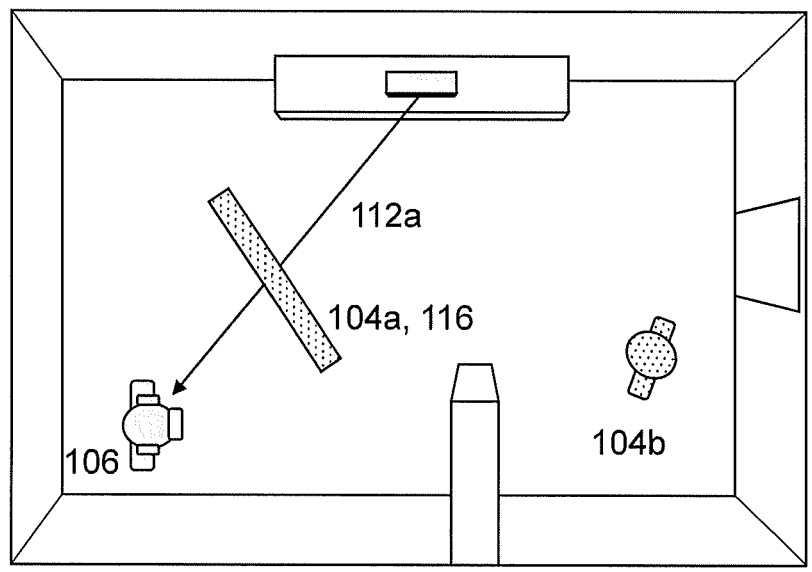

This arrangement is described further with reference to FIG. 12A and FIG. 12B. In FIG. 12A, the outputting means 108 is configured to operate in the first mode, as the virtual object 104 does not occlude the direct audio signals 112*a* from the real audio source 102. In FIG. 12B, two virtual objects 104*a*, 104*b* are present. 104*b* has no occluding effect, but virtual object 104*a* has an occluding effect on the direct audio signals 112*a*. Virtual object 104*a* therefore acts as an obstruction 116 in the environment. It will therefore be understood that the occluded region 122 will differ between FIG. 12A and FIG. 12B; the switching between the first mode and the second mode of the outputting means is therefore determined not just on a position of a user relative to a static occluded region, but on the relative positions of the user 106 and one or more virtual objects 104 present in the environment.

In some example embodiments, other parameters or factors may be used by the means for switching in determining whether to switch the operating means between the first and second modes. The frequency of the switching may be chosen to minimize disruption of the immersive AR user experience. Some factors which may be used are discussed below.

The user trajectory 126 and the speed of movement of the user may be taken into account when switching between modes of operation. The trajectory and speed may be used to estimate the user's position 124 a few moments into the future (i.e. at a future time point). If the estimated position 124 is within the occluded region 122 when a current location of the user is outside of the occluded region 122 then the closed or second mode of operation may be faded in gradually.

If there is no occluded region 122, or the area or volume of the region is smaller than a predetermined threshold value, the mode may be set to the open, first mode and not switched to the second mode. Alternatively, if the occluded region 122 covers all (or most) of the area of environment 100, the mode may be set to the closed, second mode and not switched. This approach can reduce computational resources in switching the outputting means operating mode in cases where the effect on the user will be minimal.

After switching to the second mode, the subsequent switch back to the open, first mode can be delayed for a suitable period of time in order to maintain continuity of audio output and provide a smooth transition. For example, the switch to the first mode may be delayed until the user's 106 position is such that the occlusion by the virtual object 104 is insignificant. However, the switch to the second, closed, mode can be more immediate to provide intuitive activation of the occlusion effect to the user 106. The immersive experience may therefore be improved, while efficiently managing computational resources.

If there are no real-life sound sources present (i.e. no real audio source 102), the open mode may be used at all times. In some examples, the user's 106 interaction with the real-life sources (such as speaking to another person, or speaking to a home assistant) may override the switching and the system may remain in the first mode to allow low-latency (or no latency) communication by the user.

Figure 13:
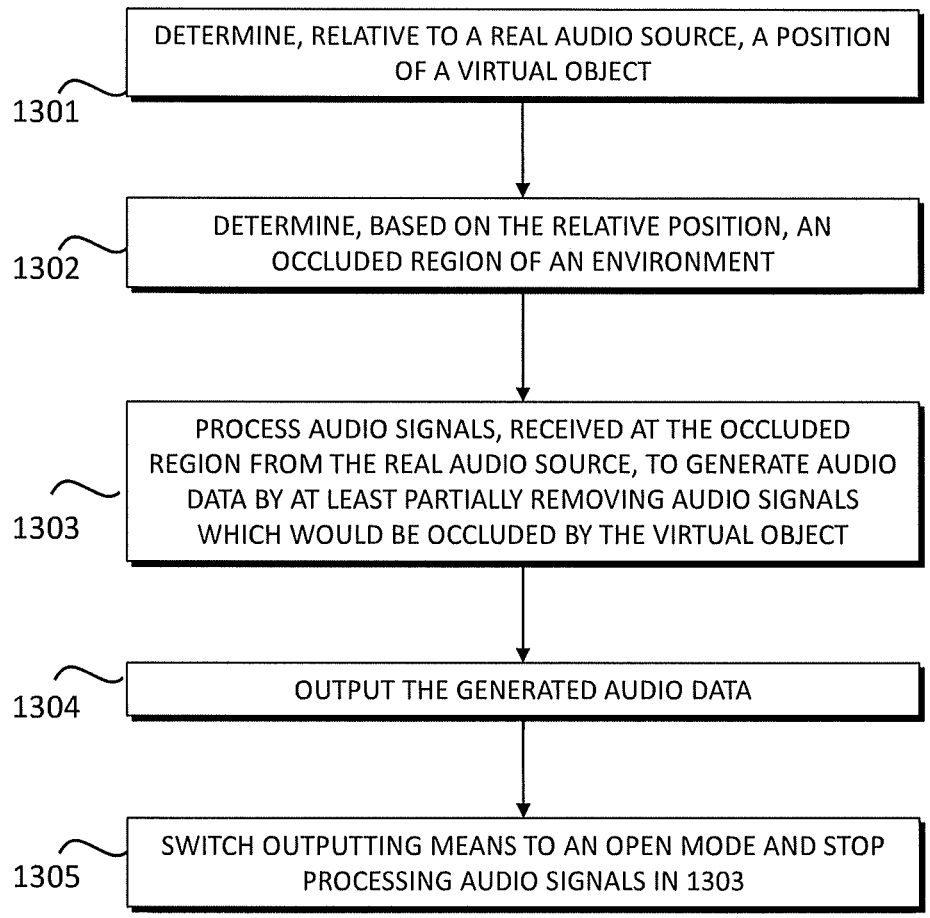
FIG. 13 is a flow diagram showing processing operations according to some example embodiments.

FIG. 13 is a flow diagram showing processing operations according to some example embodiments which may provide a more realistic and intuitive representation of a virtual object in an augmented reality environment. For example, the processing operations may be performed by hardware, software, firmware or a combination thereof. The processing operations may, for example, be performed by a processing system of the AR device processing system and/or by a processing system of the AR media player 10.

A first operation 1301 may comprise determining, relative to a real audio source, a position of a virtual object. The audio source may be the real audio source 102 and the virtual object may be virtual object 104.

A second operation 1302 may comprise determining, based on the relative position, an occluded region of an environment. This determination may be by means of using any of the above-mentioned methods of position determination.

A third operation 1303 may comprise processing audio signals, received at the occluded region from the real audio source, to generate audio data by at least partially removing audio signals which would be occluded by the virtual object.

A fourth operation 1304 may comprise outputting the generated audio data to a user (with outputting means 108). The user device may be (but is not limited to) the AR headset 20 shown in FIG. 1.

An optional fifth operation 1305 may comprise switching outputting means to an open mode and stopping the processing of audio signals of operation 1303. The switching may be based on a location of a user, as discussed with reference to FIG. 12A and FIG. 12B.

Figure 14:
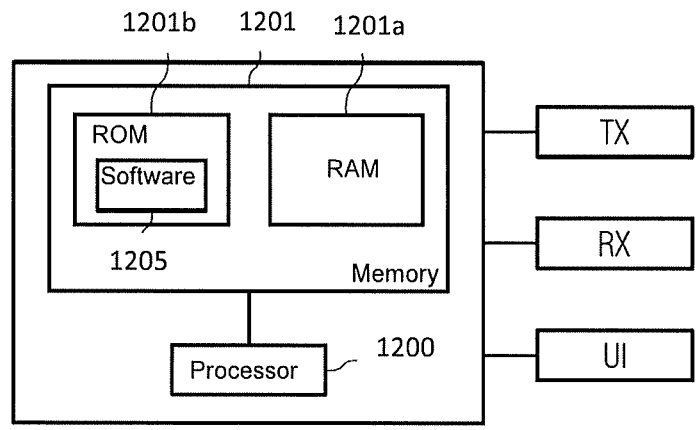
FIG. 14 is a schematic view of an apparatus which may be configured according to one or more example embodiments.

FIG. 14 shows an apparatus according to some example embodiments. The apparatus may be configured to perform the operations described herein, for example operations described with reference to any disclosed process. The apparatus comprises at least one processor 1200 and at least one memory 1201 directly or closely connected to the processor. The memory 1201 includes at least one random access memory (RAM) 1201a and at least one read-only memory (ROM) 1201b. Computer program code (software) 1205 is stored in the ROM 1201b. The apparatus may be connected to a transmitter (TX) and a receiver (RX). The apparatus may, optionally, be connected with a user interface (UI) for instructing the apparatus and/or for outputting data.

The at least one processor 1200, with the at least one memory 1201 and the computer program code 1205 are arranged to cause the apparatus to at least perform at least the method according to any preceding process, for example as disclosed in relation to the flow diagram of FIG. 13 and related features thereof. The apparatus may comprise some or all of the AR system of FIG. 1.

Figure 15:
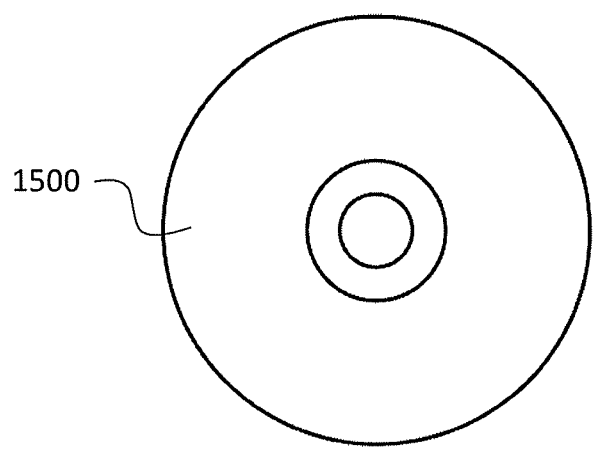
FIG. 15 is a plan view of non-transitory media according to some example embodiments.

FIG. 15 shows a non-transitory media 1500 according to some embodiments. The non-transitory media 1500 is a computer readable storage medium. It may be e.g. a CD, a DVD, a USB stick, a blue ray disk, etc. The non-transitory media 1500 stores computer program code, causing an apparatus to perform the method of any preceding process for example as disclosed in relation to the flow diagram of FIG. 13 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DVD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:
1. An apparatus comprising:
at least one processor; and
at least one non-transitory memory including computer program code,
the at least one memory and the computer program code configured to, with the at least one processor, cause the apparatus to:

determine, relative to one or more real audio sources in an environment, a relative position of a virtual object in the environment;

determine, based on the relative position, an occluded region of the environment in which one or more audio signals from the one or more real audio sources would be occluded with the virtual object;

receive, from the one or more real audio sources, audio signals;

output, to a user in the environment, audio data, where the apparatus comprises a head worn device comprising output circuitry configured to operate in a first mode and in a second mode, wherein the first mode is an open mode, and substantially no processing is performed on the received audio signals received from the one or more real audio sources to output the audio data in the first mode, and wherein in the second mode the audio data is generated with processing the received audio signals received from the one or more real audio sources to at least partially remove the one or more audio signals which would be occluded with the virtual object; and switch the output circuitry between the first mode and the second mode based on a location of the user relative to the occluded region.

2. The apparatus of claim 1, wherein the apparatus comprises receiving circuitry including one or more microphones and the output circuitry comprises one or more audio output transducers.

3. The apparatus of claim 1, wherein the apparatus comprises receiving circuitry, and the receiving circuitry and the output circuitry are provided with an augmented reality device wearable by the user, the augmented reality device providing the virtual object.

4. The apparatus of claim 3, wherein the apparatus is the augmented reality device.

5. The apparatus of claim 1, wherein the determining, relative to the one or more real audio sources in the environment, the relative position of the virtual object in the environment comprises the at least one memory and the computer program code being configured to, with the at least one processor, cause the apparatus to:

determine, based on the received audio signals, a position of the one or more real audio sources in the environment; and determine one or more of a size, a location or an orientation of the virtual object from associated augmented reality content.

6. The apparatus of claim 1, wherein the second mode is a closed mode, and where the at least one memory and the computer program code are configured to, with the at least one processor, cause the apparatus to:

process the received audio signals from the one or more real audio sources to at least partially remove the one or more audio signals which would be occluded with the virtual object; and provide the processed audio signals to the output circuitry.

7. The apparatus of claim 1, wherein the switching between the first mode and the second mode based on the location of the user relative to the occluded region comprises the at least one memory and the computer program code being configured to, with the at least one processor, cause the apparatus to:

determine a current location of the user at a current time point;

operate the output circuitry in the first mode when the current location of the user is outside of the occluded region; and operate the output circuitry in the second mode when the current location of the user is within the occluded region.

8. The apparatus of claim 7, wherein the at least one memory and the computer program code are configured to, with the at least one processor, cause the apparatus to:

determine an estimated position of the user at a future time point, wherein switching between the first mode and the second mode based on the location of the user relative to the occluded region comprises switching between the first mode and the second mode based on the current location of the user and the estimated position of the user.

9. The apparatus of claim 1, wherein, in the first mode, no processing is performed on the audio signals received from the one or more real audio sources, and the audio signals received from the one or more real audio sources are configured to be heard by the user without intermediate processing.

10. The apparatus of claim 1, wherein the open mode is a transparent or pass-through mode.

11. The apparatus of claim 1, wherein the at least one memory and the computer program code are configured to, with the at least one processor, cause the apparatus to process the audio signals received from the one or more real audio sources to compensate for an acoustic effect of the virtual object on the received audio signals.

12. The apparatus of claim 1, wherein the output circuitry is configured to output audio data associated with the virtual object in both the first and second modes.

13. The apparatus of claim 1, wherein the switching of the output circuitry between the first mode and the second mode is further based on a size of the occluded region.

14. The apparatus of claim 1, wherein the output circuitry is switched between the first mode and the second mode based on a location of the user within or outside of the occluded region.

15. A method comprising:

determining, relative to one or more real audio sources in an environment, a relative position of a virtual object in the environment;

determining, based on the relative position, an occluded region of the environment in which one or more audio signals from the one or more real audio sources would be occluded with the virtual object;

receiving, from the one or more real audio sources, audio signals;

outputting, to a user in the environment, audio data via a head worn device comprising output circuitry configured to operate in a first mode or in a second mode, wherein the first mode is an open mode, and substantially no processing is performed on the received audio signals received from the one or more real audio sources to output the audio data in the first mode, and wherein in the second mode the audio data is generated with processing the received audio signals received from the one or more real audio sources to at least partially remove the one or more audio signals which would be occluded with the virtual object; and switching the output circuitry between the first mode and the second mode based on a location of the user relative to the occluded region.

16. A non-transitory program storage device readable with a machine, tangibly embodying a program of instructions executable with the machine for performing operations, the operations comprising the method as claimed in claim 15.

17. The method of claim 15, wherein the output circuitry are associated with receiving circuitry including one or more microphones, wherein the output circuitry comprises one or more audio output transducers.

18. The method of claim 15, wherein the output circuitry are associated with receiving circuitry, wherein the receiving circuitry and the output circuitry are provided with an augmented reality device wearable by the user, the augmented reality device providing the virtual object.

19. The method of claim 15, wherein the determining, relative to the one or more real audio sources in an environment, the relative position of the virtual object in the environment comprises:
    determining, based on the received audio signals, a position of the one or more real audio sources in the environment; and
    determine one or more of a size, a location or an orientation of the virtual object from associated augmented reality content.

20. A non-transitory computer-readable medium comprising program instructions stored thereon for performing at least the following:
    determining, relative to one or more real audio sources in an environment, a relative position of a virtual object in the environment;
    determining, based on the relative position, an occluded region of the environment in which one or more audio signals from the one or more real audio sources would be occluded with the virtual object;
    causing receiving, from the one or more real audio sources, of audio signals;
    causing outputting, to a user in the environment, of audio data via a head worn device comprising output circuitry configured to operate in a first mode or in a second mode, wherein the first mode is an open mode, and substantially no processing is performed on the received audio signals received from the one or more real audio sources to output the audio data in the first mode, and wherein in the second mode the audio data is generated with processing the received audio signals received from the one or more real audio sources to at least partially remove the one or more audio signals which would be occluded with the virtual object; and
    causing switching of the output circuitry between the first mode and the second mode based on a location of the user relative to the occluded region.

* * * * *